UNITED STATES PATENT OFFICE 2,687,972

PREPARATION OF COMPOSITE CALCIUM SULFATE-ZINC SULFIDE PIGMENTS

Herbert Mills, Liverpool, and Harold Ford, Widnes, England, assignors to Orr's Zinc White Limited, London, England No Drawing. Application October 18, 1949, Serial No. 122,141

Claims priority, application Great Britain October 21, 1948

3 Claims. (Cl. 106—293)

The present invention concerns the manufacture of a composite calcium sulphate/zinc sulphide pigment.

An object of the invention is to produce a white pigment which, when used in paint, will be free from discoloration.

It is known that in the course of the chemical reaction expressed by the equation $$ZnSO_4 + Ca(SH)_2 \rightarrow ZnS + CaSO_4 + H_2S$$

the resultants will comprise a composite coprecipitated mixture of molecules of zinc sulphide and calcium sulphate and the gas hydrogen sulphide ($H_2S$), some of which is liberated from the slurry leaving the slurry saturated with the gas.

In the application of this reaction to the process of manufacturing a pigment by the art well known in the manufacture of lithopone we have found that the usual heat treatment of the co-precipitate by the process known as calcining will lead to the formation of calcium sulphide in the final product. We have also found that the presence of calcium sulphide is objectionable as it reacts with the driers of paint media and produces discoloration, and composite calcium sulphate/zinc sulphide pigment containing such calcium sulphide is not a satisfactory white pigment.

Another object of our invention is therefore the elimination of calcium sulphide in the preparation of composite calcium sulphate/zinc sulphide pigment.

We have found that this formation of calcium sulphide during calcination may be prevented by the presence of a slight excess of soluble zinc in the co-precipitate before calcining. The zinc excess is preferably in the form of zinc sulphate, but might be in the form of zinc chloride or other soluble zinc salt. This results in a satisfactory white pigment being obtained. In carrying out the present invention we preferably employ a method of elimination of hydrogen sulphide from the slurry containing the co-precipitates by adding to it a small portion of zinc sulphate followed after a short interval by calcium carbonate slurry to neutrality (to eliminate free sulphuric acid from the slurry), alternate additions of zinc sulphate and calcium carbonate being made until hydrogen sulphide is eliminated.

We will now describe our preferred method of producing a satisfactory white pigment with reference to the production of a pigment which will contain the two components zinc sulphide and calcium sulphate in approximate molecular proportions, i. e. approximately 41% zinc sulphide, the balance being calcium sulphate.

We take a closed vessel and charge it with a zinc sulphate solution of 50° Tw. density at 60° C. Into this vessel and its contents we add slowly a calcium hydrosulphide liquor of 14/15° Tw. density at 40° C. Concentrations and temperatures of these orders are chosen because they provide a coprecipitate or slurry whose consistency is convenient for its subsequent processing. They also permit, if the addition of calcium hydrosulphide be made slowly, the easy liberation of the gas hydrogen sulphide ($H_2S$) which gas can then conveniently be used for other processes not described. Its uncontrolled presence forms an industrial hazard.

We use a zinc sulphate solution prepared according to the methods well known in the art of pigment manufacture and a calcium hydrosulphide liquor of high purity prepared by any suitable means, which contains a minimum of polysulphides.

The proportions of zinc sulphate and calcium hydrosulphide respectively admitted to the vessel are adjusted to near equivalence but so, however, that with the zinc sulphate slightly predominating the above mentioned reaction can proceed to the zinc end point. We now proceed to eliminate residual hydrogen sulphide from the slurry by the alternate addition of zinc sulphate solution and calcium carbonate slurry in the manner described above. When the elimination is complete we again add an excess of zinc sulphate solution to the slurry containing the co-precipitate of zinc sulphide and calcium sulphate. The excess of zinc sulphate required for the purpose of our invention is usually such that the filtrate from the slurry will give a red-orange coloration on the addition of British Drug House Universal Indicator (pH of approximately 4). This condition of zinc sulphate in excess leads we find, to the exclusion of calcium sulphide from the final product and is an essential feature of our invention. The test, however, given above is not necessarily absolute but it forms a useful guide to the composition of the coprecipitated mixture.

The actual excess required is best regulated by a practical test in paint to ensure freedom from discoloration.

From the above description it will be seen that the reactions which occur during the production of the pigment may be expressed by the following formulas:

1. $ZnSO_4 + Ca(SH)_2 \rightarrow ZnS + CaSO_4 + H_2S$
2. $H_2S + ZnSO_4 \rightarrow ZnS + H_2SO_4$
3. $H_2SO_4 + CaCO_3 \rightarrow CaSO_4 + H_2O + CO_2$
4. $ZnS + CaSO_4 + ZnSO_4 + \Delta \rightarrow$
   Final product (contains no CaS)

From the above reactions it is readily apparent that the treatment, in the second reaction, of the hydrogen sulphide with the soluble zinc salt, there indicated as zinc sulphate, brings about the elimination of the residual hydrogen sulphide remaining in the slurry from the first reaction. The elimination of the hydrogen sulphide is desirable not only from the fact that it is undesirable in the calcined pigment because of the discoloring effect which it has when the pigment is used in paints, but also because it is not present during the calcining stage and thus is not present to react with calcium sulphate to form calcium sulphide which, as previously indicated, is also an undesirable constituent of the calcined pigment since it also tends to bring about discolorization of paint when the pigment is used for that purpose. By the third reaction, the sulphuric acid formed during the elimination of the hydrogen sulphide is neutralized before the calcining operation. This is desirable since the presence of sulphuric acid in the calcined charge creates a condition favorable for the formation of zinc oxide when the zinc sulphide, calcium sulphate and zinc sulphate are calcined. While zinc oxide is itself a pigment, nevertheless it is recognized that it is not a desirable constituent in pigments of the type with which the present invention is concerned.

To improve the light fastness of the product a small amount (0.015%) of cobalt, calculated on the zinc content, may be added to the zinc sulphate as cobalt ammonium sulphate.

After precipitation is completed the slurry is filtered, dried and calcined. This heat treatment (calcining) is necessary for development of the pigmentary characteristics of the zinc sulphide/calcium sulphate mixture and is a well recognised step in the art of pigment manufacture.

The final product of the calcining process, manufactured according to our invention needs no washing. It can be ground forthwith after cooling according to the ordinary practice of the art.

In addition to the test above described we apply a further test to the final manufactured product after it has been ground, so as to ensure that the objectionable calcium sulphide is absent. This test takes the form of preparing a sample paint using the recognised oleo-resinous media containing driers, which paint if it is discolored gives a clear indication that the steps of our invention requisite to exclude calcium sulphide have not been properly carried out.

We may also apply the process of our invention described above to the manufacture of pigments which consist of a composite co-precipitate mixture of the substances zinc sulphide and calcium sulphate in all proportions ranging from a mixture which contains a trace of zinc sulphide to a mixture which contains a trace of calcium sulphate.

During the calcining air may be admitted to the heat treatment furnace in quantity sufficient to achieve removal of any remaining traces of calcium sulphide but insufficient to cause any appreciable formation of zinc oxide.

The calcined powder may be further treated for removal of calcium sulphide by quenching with water to form a slurry. To this slurry we add sulphuric acid or other mineral acid until the slurry reacts acid to an indicator preferably methyl orange or to a pH indicator meter, or other indicating means. The slurry is washed, dried and ground according to the ordinary practice in the art.

In our copending applications Serial No. 122,142, and Serial No. 122,143, both filed October 18, 1949, we disclose and claim certain modified processes.

We claim:

1. The method of preparing a calcium sulphate/zinc sulphide white pigment substantially free from calcium sulphide, which comprises forming a composite co-precipitate of calcium sulphate and zinc sulphide in an aqueous slurry thereof containing hydrogen sulphide, bringing the slurry of the co-precipitate into intimate contact with zinc sulphate and then with calcium carbonate until the slurry is substantially free of hydrogen sulphide and neutral, adding to the substantially hydrogen sulphide-free and neutral slurry a compound from the class consisting of zinc sulphate and zinc chloride in such amount that the slurry has a pH of about 4, drying the slurry and calcining the dried co-precipitate.

2. The method of preparing a calcium sulphate/zinc sulphide white pigment substantially free from calcium sulphide, which comprises forming a composite co-precipitate of calcium sulphate and zinc sulphide in an aqueous slurry thereof containing hydrogen sulphide, eliminating hydrogen sulphide in the slurry by adding zinc sulphate thereto, neutralizing the resulting acidity by the addition of calcium carbonate to the slurry, repeating the additions to the slurry of zinc sulphate and calcium carbonate as aforesaid until the slurry is substantially free of hydrogen sulphide, adding to the substantially hydrogen sulphide-free and neutral slurry zinc sulphate in amount to give the slurry a pH of about 4, drying the slurry and calcining the dried co-precipitate.

3. The method of preparing a calcium sulphate/zinc sulphide white pigment as set forth in claim 1 in which zinc sulphate is added to the substantially hydrogen sulphide-free and neutral slurry.

References Cited in the file of this patent

UNITED STATES PATENTS

| Number | Name | Date |
|---|---|---|
| 1,886,165 | Christensen | Nov. 1, 1932 |
| 1,889,130 | Patterson | Nov. 29, 1932 |
| 1,977,583 | Hanahan | Oct. 16, 1934 |
| 2,016,537 | Booge | Oct. 8, 1935 |
| 2,112,357 | Butler et al. | Mar. 29, 1938 |
| 2,123,698 | Hanahan et al. | July 12, 1938 |

OTHER REFERENCES

"Comprehensive Treatise on Inorganic and Theoretical Chemistry," Mellor, vol. 3; Longmans, Green and Co., London, 1923; pages 744–45.